US010910645B2

(12) United States Patent
Yu et al.

(10) Patent No.: US 10,910,645 B2
(45) Date of Patent: Feb. 2, 2021

(54) COPPER SUBSTITUTED COMPOUND, CATHODE OF BATTERY COMPRISING SAME, AND BATTERY COMPRISING SUCH CATHODE

(71) Applicant: City University of Hong Kong, Hong Kong (HK)

(72) Inventors: Yau Wai Denis Yu, Hong Kong (HK); Wenpei Kang, Anyang (CN); Chun Sing Lee, Kowloon (HK)

(73) Assignee: CITY UNIVERSITY OF HONG KONG, Kowloon Tong (HK)

( * ) Notice: Subject to any disclaimer, the term of this patent is extended or adjusted under 35 U.S.C. 154(b) by 850 days.

(21) Appl. No.: 14/853,382

(22) Filed: Sep. 14, 2015

(65) Prior Publication Data

US 2017/0077500 A1 Mar. 16, 2017

(51) Int. Cl.
| | |
|---|---|
| H01M 4/525 | (2010.01) |
| H01M 4/485 | (2010.01) |
| H01M 4/505 | (2010.01) |
| C01G 45/12 | (2006.01) |
| H01M 4/131 | (2010.01) |
| H01M 10/054 | (2010.01) |
| H01M 10/0525 | (2010.01) |

(52) U.S. Cl.
CPC ........ H01M 4/525 (2013.01); C01G 45/1228 (2013.01); H01M 4/485 (2013.01); H01M 4/505 (2013.01); C01P 2002/72 (2013.01); C01P 2002/76 (2013.01); C01P 2002/85 (2013.01); C01P 2004/03 (2013.01); C01P 2004/04 (2013.01); C01P 2006/40 (2013.01); H01M 4/131 (2013.01); H01M 10/054 (2013.01); H01M 10/0525 (2013.01)

(58) Field of Classification Search
CPC ............. C01G 45/1228; C01P 2002/72; C01P 2002/76; C01P 2002/85; C01P 2004/03; C01P 2004/04; C01P 2006/40; H01M 10/0525; H01M 10/054; H01M 4/131; H01M 4/485; H01M 4/48505; H01M 4/525

See application file for complete search history.

(56) References Cited

U.S. PATENT DOCUMENTS

| | | | | |
|---|---|---|---|---|
| 2010/0104944 A1* | 4/2010 | Saito | ...................... | H01M 4/131 429/223 |
| 2011/0151325 A1* | 6/2011 | Kim | ...................... | H01M 4/366 429/212 |
| 2011/0274950 A1* | 11/2011 | Whitacre | .............. | H01M 4/587 429/50 |
| 2012/0219844 A1* | 8/2012 | Tsutsumi | ............... | H01G 11/06 429/153 |
| 2016/0049653 A1* | 2/2016 | Obrovac | ................ | C01G 37/14 429/231.1 |

OTHER PUBLICATIONS

Eriksson et al., Influence of Substitution on the Structure and Electrochemistry of Layered Manganese Oxides, 2003, Materials Sciences and Evironmental Energy Technologies Divisions, Lawrence Berkeley National Laboratory, University of California, 15, 4456-4463 (Year: 2003).*
Armand et al., "Building Better Batteries", Nature, vol. 451, Feb. 2008, pp. 652-657.
Choi et al., "Challenges Facing Lithium Batteries and Electrical Double-Layer Capacitors", Angewandte Reviews, 2012, pp. 9994-10024.
Scrosati et al., "Lithium-Ion Batteries. A Look into the Future", Energy Environ. Sci., 2011, 4, pp. 3287-3295.
Kim et al., "Electrode Materials for Rechargeable Sodium-Ion Batteries: Potential Alternatives to Current Lithium-Ion Batteries", Adv. Energy Mater 2012, 2, pp. 710-721.
Park et al., "Anomalous Manganese Activation of a Pyrophosphate Cathode in Sodium Ion Batteries: A Combined Experimental and Theoretical Study", J. Am. Chem. Soc., 2013, 135, pp. 2787-2792.
Sun et al., "Direct Atomic-Scale Confirmation of Three-Phase Storage Mechanism in Li4Ti5O12 Anodes for Room-Temperature Sodium-Ion Batteries", Nature Communications, 2013, pp. 1-13.
Jian et al., "Superior Electrochemical Performance and Storage Mechanism of Na3V2(PO4)3 Cathode for Room-Temperature Sodium-Ion Batteries", Adv. Energy Mater., 2013, 3, pp. 156-160.
Pan et al., "Room-Temperature Stationary Sodium-Ion Batteries for large-Scale Electric Energy Storage", Energy Environ. Sci., 2013, 6, pp. 2338-2360.
Slater et al., "Sodium-Ion Batteries", Adv. Fund. Mater., 2013, 23, pp. 947-958.
Han et al., "A Comprehensive Review of Sodium Layered Oxides: Powerful Cathodes for Na-Ion Batteries", Energy Environ. Sci., 2015, 8, pp. 81-102.
Billaud et al., "A High-Performance Cathode for Sodium-Ion Batteries", J. Am. Chem. Soc., 2014, 136, pp. 17243-17248.
Barpanda et al. "Sodium Iron Pyrophosphate: A Novel 3.0 V Iron-Based Cathode for Sodium-Ion Batteries", Electrochemistry Communications 2012, 24, pp. 116-119.
Duan et al., Na3V2(PO4)3@C Core-Shell Nanocomposites for Rechargeable Sodium-Ion Batteris, J. Mater. Chem., 2014, 2, pp. 8668-8675.
Honma et al., "Triclinic Na2-xFe1+x/2P2O7/C Glass-Ceramics with High Current Density Performance for Sodium Ion Battery", Journal of Power Sources, 227, 2013, pp. 31-34.

(Continued)

Primary Examiner — Adam A Arciero
(74) Attorney, Agent, or Firm — Melvin Li; Heslin Rothenberg Farley & Mesiti PC

(57) ABSTRACT

There is provided a compound for use as material in cathode of a battery. The compound has i) at least sodium or ii) sodium and lithium as a first ingredient, copper as a second ingredient, at least a first transition metal in a third ingredient (M) selected from a group including manganese, nickel, iron, copper, zinc, chromium, vanadium, titanium, molybdenum and tungsten, niobium; and oxygen as a fourth ingredient; and wherein the compound has a chemical formula of $Na_y Cu_x M_{1-x} O_2$, or $Li_a Na_b Cu_x M_{1-x} O_2$.

4 Claims, 11 Drawing Sheets

(56) References Cited

OTHER PUBLICATIONS

Mason et al., "Iron(III) Sulfate: A Stable, Cost Effective Electrode Material for Sodium Ion Batteries", 50, 18, Mar. 4, 2014, pp. 2225-2378.

Jung et al., "Graphene-Supported Na3V2(PO4)3 as a High Rate Cathode Material for Sodium-Ion Batteries", J. Mater. Chem., 2013, pp. 11350-11354.

Berthelot et al., "Electrochemical Investigation of the P2-NaxCoO2 Phase Diagram", Nature Materials, 10, 2011, pp. 74-80.

Komaba et al., Electrochemical Intercalation Activity of Layered NaCrO2 vs. LiCrO2, Electrochemistry Communications, 12, 2010, pp. 355-358.

Zhao et al., "Electrochemical and Therma Properties of x-NaFeO2 Cathode for Na-Ion Batteries", Journal of the Electrochemical Society, 160, 2013, pp. A3077-A3081.

Yabuuchi et al., "Crystal Structures and Electrode Performance of Alpha-NaFeO2 for Rechargeable Sodium Batteries", The Electrochemical Society of Japan, Oct. 5, 2012, pp. 716-719.

Ma et al., "Electrochemical Properties of Monoclinic NaMnO2", Journal of the Electrochemical Society, 158, 2011, pp. A1307-A1312.

Delmas et al., "Nickel Hydroxide and Derived Phases Obtained by Chimie Douce From NaNiO2", Solid State Ionics 32, 1989 pp. 104-111.

Delmas et al., "Structural Classification and Properties of the Layered Oxides", Physica 99B, 1980, pp. 81-85.

Mendiboure et al., "Electrochemical Intercalation and Deintercalation of NaxMnO2 Bronzes", Journal of Solid State Chemistry, 57, 1985, pp. 323-331.

Bucher et al., "Layered NaxMnO2=z in Sodium Ion Batteries—Influence of Morphology on Cycle Performance", ACS Appl. Mater. Interfaces, 6, 2014, pp. 8059-8065.

Su et al., "Single Crystalline Na0.7MnO2 Nanoplates as Cathode Materials for Sodium-Ion Batteries with Enhanced Performance", Chem. Eur. J. 19, 2013, pp. 10884-10889.

Wang et al., "Electrode Properties of P2-Na2/3MnyCo1-yO2 as Cathode Materials for Sodium-Ion Batteries", J. Phys. Chem. C 117, 2013, pp. 15545-15551.

Zhao et al., "Synthesis of Metal Ion Substituted P2-Na2/3Ni1/3Mn2/3O2 Cathode Material with Enhanced Performance for Na Ion Batteries", Materials Letters, 135, 2014, pp. 131-134.

Zhao et al., "Electrochemical and Thermal Properties of P2-type Na2/3Fe1/3Mn2/3O2 for Na-Ion Batteries", Journal of Power Sources, 264, 2014, pp. 235-239.

De Boisse et al., "P2-NaxMn1/2Fe1/2O2 Phase Used as Positive Electrode in Na Batteries: Structural Changes Induced by the Electrochemical (De)intercalation Process" Inorg. Chem., 53, 2014, pp. 11197-11205.

Yabuuchi et al., "P2-TypeNax[Fe1/2Mn1/2]O2 Made From Earth-Abundant Elements for Rechargeable NaBatteries", Nature Materials, 11, Jun. 2012, pp. 512-517.

Zhu et al., "Free-Standing Na2/3Fe1/2Mn1/2O2@Graphene Film for a Sodium-Ion Battery Cathode", Appl. Mater. Interfaces 6, 2014, pp. 4242-4247.

Billaud et al., "Na0.67Mn1-xMgxO2 (0<x<0.2): A High Capacity Cathode for Sodium-Ion Batteries", Energy Environ. Sci., 7, 2014, pp. 1387-1391.

Yabuuchi et al., "A New Electrode Material for Rechargeable Sodium Batteries: P2-type Na2/3[Mg0.28Mn0.72]O2 with Anomalously High Reversible Capacity", J. Mater. Chem., 2, 2014, pp. 16851-16855.

Mason et al., "Beyond Divalent Copper: A Redox Couple for Sodium Ion Battery Cathode Materials", ECS Electrochemistry Letters, 4, 2015, pp. A41-A44.

Hasa et al., "High Performance Na0.5[Ni0.23Fe0.13Mn0.63]O2 Cathode for Sodium-Ion Batteries", Adv. Energy Mater., 4, 2014, pp. 1-7.

Kim et al., "Layered Na[Ni1/3Fe1/3Mn1/3]O2 Cathodes for Na-Ion Battery Application", Electrochemistry Communications, 18, 2012, pp. 66-69.

Yuan et al., "Synthesis and Electrochemical Behaviors of Layered Na0.67[Mn0.65Co0.2Ni0.15]O2 Microflakes as a Stable Cathode Material for Sodium-Ion Batteries", J. Mater. Chem., 1, 2013, pp. 3895-3899.

Doubaji et al., "Synthesis and Characterization of a New Layered Cathode Material for Sodium Ion Batteries", Journal of Power Sources, 266, 2014, pp. 275-281.

Chagas et al., "P-Type NaxNi0.22Co0.11Mn0.66O2 Materials: Linking Synthesis with Structure and Electrochemical Performance", J. Mater. Chem, 2, 2014, pp. 20263-20270.

Caballero et al., "Synthesis and characterization of high-temperature hexagonal P2-Na0.6 MnO2 and its electrochemical behaviour as cathode in sodium cells", J. Mater. Chem., 12, 2002, pp. 1142-1147.

Lu et al., "Superlattice Ordering of Mn, Ni, and Co in Layered Alkali Transition Metal Oxides with P2, P3, and O3 Structures", Chem. Mater., 12, 2000, pp. 3583-3590.

Shu-Yin et al., "Novel copper redox-based cathode materials for room-temperature sodium-ion batteries", Chin. Phys. B, 23, 2014, pp. 1-4.

Li et al., "Air-Stable Copper-Based P2-Na 7/9 Cu 2/9 Fe 1/9 Mn 2/3 O 2 as a New Positive Electrode Material for Sodium-Ion Batteries", Adv. Sci., 2015, pp. 1-7.

Goodenough, "Evolution of Strategies for Modern Rechargeable Batteries", 46, 2013, pp. 1053-1061.

Mukherjee et al., "Nanostructuredelectrodesforhigh-powerlithium ion batteries", Nano Energy, 1, 2012, pp. 518-533.

Parant et al., "Sur Quelques Nouvelles Phases de Formule Na,MnO, (x G 1)", Journal of Solid State Chemistry, 3, 1971, pp. 1-11.

\* cited by examiner

COPPER SUBSTITUTED COMPOUND, CATHODE OF BATTERY COMPRISING SAME, AND BATTERY COMPRISING SUCH CATHODE

FIELD OF THE INVENTION

The present invention is concerned with a compound for use as material in cathode of a battery, a cathode of battery comprising same, and a battery comprising such cathode.

BACKGROUND OF THE INVENTION

With the tremendous rise in usage of mobile electronics and electrical devices or otherwise apparatus without a fixedly attached electrical power cable, there is a high demand for batteries which can power these devices or apparatus. While conventional lithium-ion batteries (LIBs) have been used extensively, there exists limitations with such conventional batteries. For example, litium is not a very abundant element on earth and accordingly the cost of using lithum as a main ingredient in making essential compound in the cathode of a battery is high. Further, extracting litum from natural resources often would harm the environemnt and cause irrepairable damages to the ecosystem.

The present invention seeks to address the above problem, propose an alternative compound material which can be used as a cathode material in a battery, or at least to provide an alternative to the public.

SUMMARY OF THE INVENTION

According to a first aspect of the present invention, there is provided a compound for use as material in cathode of a battery, comprising i) at least sodium or ii) sodium and lithium as a first ingredient, copper as a second ingredient, at least a first transition metal in a third ingredient (M) selected from a group including manganese, nickel, iron, copper, zinc, chromium, vanadium, titanium, molybdenum and tungsten, niobium, and oxygen as a fourth ingredient; and wherein the compound has a chemical formula of $Na_yCu_xM_{1-x}O_2$, or $Li_aNa_bCu_xM_{1-x}O_2$.

In an embodiment, the compound may comprise only sodium as the first ingredient. In this embodiment, the chemical formula may be $Na_yCu_xM_{1-x}O_2$, wherein $0.6 \leq y \leq 0.75$ and $0.02 \leq x \leq 0.30$.

Preferably, the compound may comprise a second transition metal (A) in the third ingredient, the second transition metal (A) selected from a group including nickel, iron, cobalt, and vanadium. In an embodiment, the first transition metal may be manganese. In this embodiment, the chemical formula may be $Na_yCu_xMn_{1-x-z}A_zO_2$, wherein $0.6 \leq y \leq 0.75$, $0.02 \leq x \leq 0.30$, and $0 \leq z \leq 0.67$.

In one embodiment, the compound may comprise both sodium and lithium in the first ingredient. In this embodiment, the chemical formula may be $Li_aNa_bCu_xM_{1-x}O_2$, wherein $0.6 \leq a+b \leq 0.75$ and $0.02 \leq x \leq 0.30$.

Preferably, the compound may further comprise a second transition metal (A) in the third ingredient, the second transition metal (A) selected from a group including nickel, iron, cobalt, and vanadium. In a specific embodiment, the first transition metal is manganese, and in such embodiment the chemical formula is $Li_aNa_bCu_xMn_{1-x-z}A_zO_2$, wherein $0.6 \leq a+b \leq 0.75$, $0.02 \leq x \leq 0.30$ and $0 \leq z \leq 0.67$.

These values are technically significant because if the value of y or "a+b" was less than 0.6 then the material would not assume the same structure as desired. If y or "a+b" was more than 0.75 then the material would be hygroscopic and would undesirably degrade under humidity.

According to a second aspect of the present invention, there is provided a lattice structure of a compound as described above, wherein the lattice structure has a layered structure in which one layer thereof is occupied essentially by alkali metal only, and a different layer is occupied essentially by transition metal only.

Preferably, the lattice structure may have a structure of P2, P3 or O3.

Suitably, the particle size of the compound in the lattice structure may have an average width of substantially 0.05 to 10 μm.

According to a third aspect of the present invention, there is provided a lithium-ion or sodium-ion battery system comprising a compound or a lattice structure of the compound as described above.

According to a fourth aspect of the present invention, there is provided a method of manufacture of a lattice structure as described above, comprising a step of non-solid state synthesis of ingredients including the first and second ingredient free of solid state synthesis. Preferably, the step may be a sol-gel synthesis step. The use of sol-gel synthesis provides better mixing characteristics of the ingredients.

BRIEF DESCRIPTION OF DRAWINGS

Some embodiments of the present invention will now be explained, with reference to the accompanied drawings, in which:—

DETAILED DESCRIPTION OF THE INVENTION

The demand for efficient and cost effective batteries has been increasing. For example, the increase in popularity of harvesting energy from wind and solar means there is a corresponding increase in demand of storage for this energy harvested. The present invention is broadly concerned with sodium-ion battery (NIB) or lithium-ion battery with part of the lithium therein substituted by sodium (L/NIB). Studies leading to the present invention suggested that conventional batteries using sodium in place of lithium were not efficient due to for example insufficiently high operating voltage and specific energy/power densities. The present invention provides an unexpected novel compound for use as material in cathode of a sodium-ion or lithium/sodium-ion battery which can deliver comparable if not better performance than that of conventional lithium-ion battery (LIB). One example of such novel compound material is copper-substituted P2-type Na$_{0.67}$Cu$_x$Mn$_{1-x}$O$_2$ cathode material. Experiments have shown that with the incorporation of Cu in the cathode material, the average potential increases attributed to the redox couple of Cu$^{3+}$/Cu$^{2+}$ (3.5-4.0 V). Most importantly, cycling stability of the materials is improved with Cu substitution, even at a high current rate. More than 100 mAh g$^{-1}$ can be maintained with capacity retention of about 90% after 150 cycles at current of 200 mA g$^{-1}$. A capacity retention of >70% can be obtained after 500 cycles at 1000 mA g$^{-1}$. The performance of this NIB P2-type cathode material of the present invention is comparable if not better than those in conventional LIB. Further illustration of the present invention is depicted in the following description.

In the past two decades, conventional lithium-ion batteries (LIBs) have been widely used to power portable devices such as laptops, cell phones and power tools because they can provide high energy and power densities. However, the limited lithium resources and the geographic locations of these reserves have led to a high price of LIBs. Despite the high cost of LIBs, much research effort is still being focused on increasing output of conventional LIB both in terms of power output and duration of power output.

Figure 8:
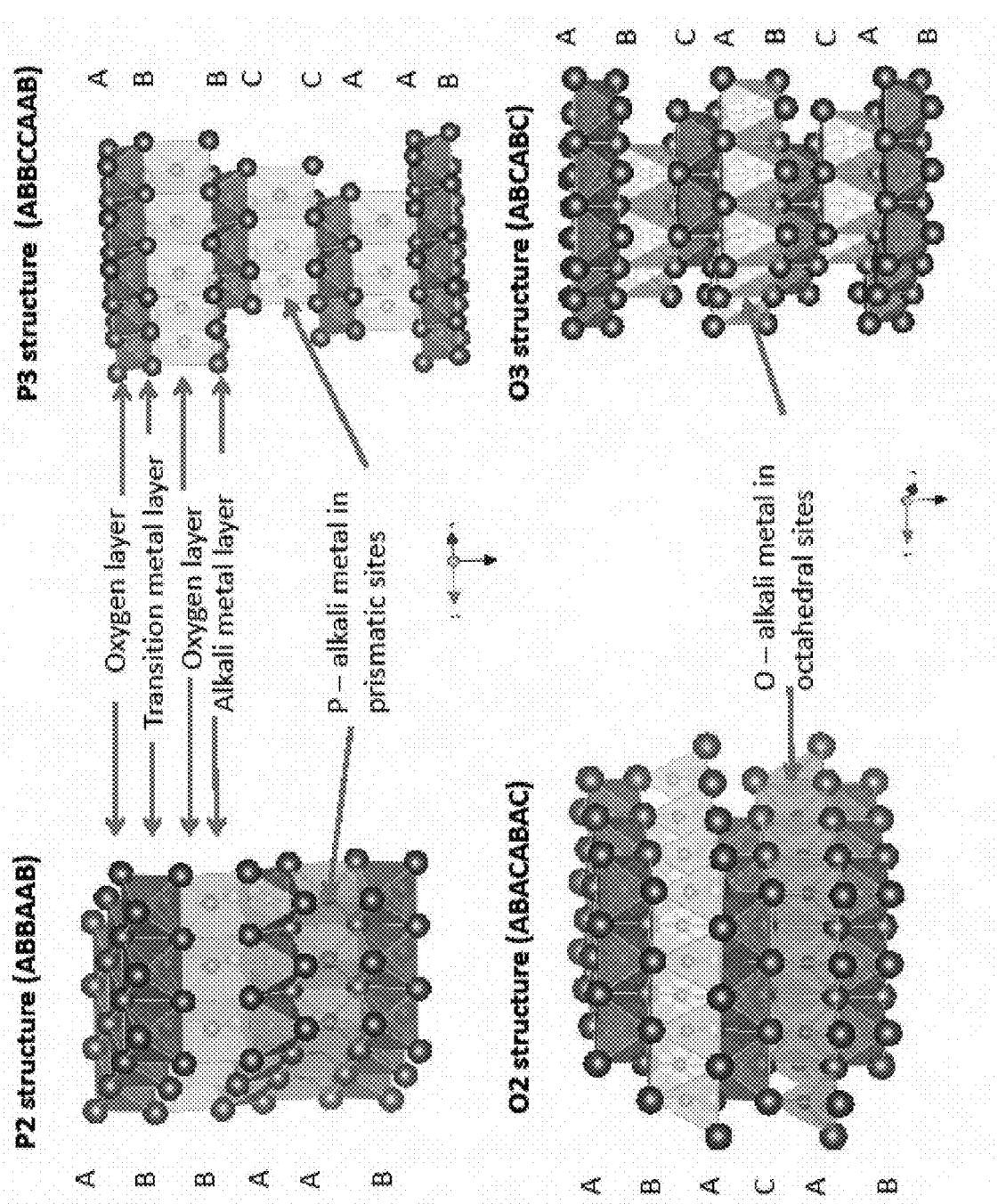
FIG. 8 is a schematic diagram illustrating O3 (bottom right), P3 top right), O2 bottom left) and P2 (top left) types of lattice structures (diagram is extracted from Yabuuchi et al, 2014, IOP Science.

Studies leading to the present invention showed that P2-, P3- and O3 type layered oxides of Na$_x$MO$_2$ (M=Ni, Co, Mn, Fe, Cr, etc.) were suitable candidates. (A layered structure refers to the particular configurational crystal structure of a material. Typically, a material with a layered structure is one where the alkali metal (e.g. Na and/or Li) occupies one layer of the material, and the transition metal occupies a different layer. The layered structure allows easy movement of the alkali metal (Na and/or Li) into and out of the lattice. Please see FIG. 8. P2, P3, O3 are typical names for different structures. The term "P" refers to the alkali metal (Na) sitting in a prismatic site inside the lattice, whereas the term "O" refers to the alkali metal in an octahedral site. The number "2" and "3" refers to the number of layers in a repeating unit. For example, "2" typically refers to a repetition every 2 layers in an "ABABAB" way (or some variation of it). "3" typically refers to a repetition every 3 layers in an "ABCAB-CABC" way. The terms P2, P3, O3 describe more details about the atomic arrangements in a layered structure.

In particular, manganese-based cathode material (P2-Na$_x$Mn$_y$M$_z$O$_2$) was one of the preferred candidates becasue it could give an initial capacity of up to 210 mAh g$^{-1}$ at a low current rate with a voltage plateau of around 2.0-2.2 V vs. Na/Na$^+$ due to the redox couple of Mn$^{3+}$/Mn$^{4+}$. The capacities and cycle performance of some of the Na-M-O materials are listed in below Table 1.

TABLE 1

Summary of results of Na—Mn—O based cathode materials

| Material | Initial capacity (mAh g$^{-1}$) | Test current (mA g$^{-1}$) | Capacity after cycling (mAh g$^{-1}$) | capacity retention | Ref |
|---|---|---|---|---|---|
| Na$_x$MnO$_{2+z}$ | 140 | 200 | 84/100th | 60% | 25 |
| Na$_{0.7}$MnO$_2$ | 125 | 180 | ~70/50th | 56% | 26 |
| Na$_{2/3}$Co$_{1/2}$Mn$_{1/2}$O$_2$ | 123 | 30 | 85/30th | 69% | 27 |
| Na$_{2/3}$Ni$_{1/3}$Mn$_{2/3}$O$_2$ | 150 | 10 | 104/30th | 69% | 28 |
| Na$_{2/3}$Fe$_{1/3}$Mn$_{2/3}$O$_2$ | 191 | 12 | 153/40th | 80% | 29 |
| Na$_x$Fe$_{1/2}$Mn$_{1/2}$O$_2$ | 185 | 6 | ~120/50th | 65% | 30 |
| Na$_{2/3}$Fe$_{1/2}$Mn$_{1/2}$O$_2$ | 190 | 12 | ~150/30th | 79% | 31 |
| Na$_{2/3}$Fe$_{1/2}$Mn$_{1/2}$O$_2$@Graphene | 91 | 12 | 60/140th | 66% | 32 |
| Na$_{0.67}$Mg$_{0.1}$Mn$_{0.9}$O$_2$ | 170 | 12 | ~130/25th | 76% | 33 |
| Na$_{2/3}$[Mg$_{0.28}$Mn$_{0.72}$]O$_2$ | 210 | 10 | ~150/30th | 71% | 34 |
| Na$_{0.68}$Cu$_{0.34}$Mn$_{0.66}$O$_2$ | 70 | ~20 | 43/1000th | 61% | 35 |
| Na$_{0.5}$[Ni$_{0.23}$Fe$_{0.13}$Mn$_{0.63}$]O$_2$ | 175 | 100 | 120/100th | 69% | 36 |
| NaNi$_{1/3}$Fe$_{1/3}$Mn$_{1/3}$O$_2$ | 120 | 75 | 100/150th | 83% | 37 |
| Na$_{0.67}$[Ni$_{0.15}$Co$_{0.2}$Mn$_{0.65}$]O$_2$ | 141 | 20 | 123/50th | 87% | 38 |
| Na$_{2/3}$Ni$_{1/9}$Co$_{2/3}$Mn$_{2/9}$O$_2$ | 110 | 12.6 | ~100/90th | 91% | 39 |
| Na$_x$Ni$_{0.22}$Co$_{0.11}$Mn$_{0.66}$O$_2$ | 130 | 12 | ~99/200th | 76% | 40 |

As shown in the above Table 1, most of these NIB materials were cycled at a low current rate (typically around 10 mA g$^{-1}$) with small number of cycles (<100 cycles). When the current rate and the number of cycles were increased, both capacities and cycle performance were significantly reduced. A material that can allow fast transport of sodium is therefore highly desirable for the development of NIB.

The studies showed that copper-substituted P2-type Na-M-O cathodes with a high potential of about 3.6 V vs. Na/Na$^+$, which is attributed to Cu$^{3+}$/Cu$^{2+}$ reaction.

These rate and cycle performances are good, with a capacity retention of about 61% after 1000 cycles at a current of C/4 (about 20 mA g$^{-1}$), but the capacity is only ~70 mAh g$^{-1}$. During the course of the present invention, a composition material with the formula of $Na_{0.67}Cu_xMn_{1-x}O_2$ (0<x<⅓) was identified in that the composite material can produce an unexpected synergetic effects of good cycling, rate performances and high capacity. Experiments using for example cyclic voltammetry (CV) and constant current charge-discharge tests, were conducted to demonstrate that the copper substituted sodium-ion composition material or copper substitued sodium/lithuim-ion composition material has a superb quality in terms of reaction potentials, capacities, and rate and cycle performances.

Experiments

Preparation of $Na_{0.67}Cu_xMn_{1-x}O_2$ (x=0, 0.14, 0.25 and 0.33)

$Na_{0.67}Cu_xMn_{1-x}O_2$ (x=0, 0.14, 0.25 and 0.33) samples were synthesized by a sol-gel route: appropriate molar ratios of sodium citrate tribasic di-hydrate, manganese acetate tetra-hydrates and copper acetate monohydrate (both Aldrich) were first dissolved in distilled water. Then the solution was stirred at 90° C. to remove the water to form a gel-like mixture. The gel was further dried at 200° C. for 12 h to obtain a powder. The powder was ball milled for 1 h and made into a pellet for calcination in air at 900° C. for 15 h.

Materials Characterization

X-ray diffraction (XRD) measurements were carried out with a Bruker D2 phaser diffractometer with Cu $K_\alpha$ line in a 2θ range of 10° to 90°. X-ray photoelectron spectroscopy (XPS) analysis was performed with a VG ESCALAB 220i-XL UHV surface analysis system with a monochromatic Al $K_\alpha$ X-ray source (1486.6 eV). Scanning electron microscopy (SEM) and transmission electron microscopy (TEM) were respectively carried out with a Philips XL30 FEG SEM (operated at 15 kV) and a Philips FEG TEM CM200 (operated at 200 kV).

Electrochemical Measurements

For the electrochemical characterization, the working electrodes were prepared by coating the obtained $Na_{0.67}Cu_xMn_{1-x}O_2$ (x=0, 0.14, 0.25 and 0.33) samples on aluminum foil after mixing with carbon black and polyvinylidene fluoride in N-methyl-2-pyrrolidinone solvent with a weight ratio of 80:10:10. Coated foils were dried at 80° C., pressed and then punched into discs with a diameter of 16 mm. The electrode discs were then dried at 110° C. for 4 h in a vacuum oven and transformed into an Ar-filled glove box. Sodium metal and glass microfiber (Whatman, GF/A) were used as counter electrode and separator, respectively. $NaClO_4$ (1 mol $L^{-1}$) in propylene carbonate (PC) with 5% fluoro-ethylene carbonate (FEC) was used as the electrolyte. Galvanostatic cycling tests were measured using a Macco Instruments system at room temperature. CV measurements were carried out over a potential window of 2.0-4.2 V at a scan rate of 0.1 mV $s^{-1}$ using an electrochemical workstation (CHI 660D).

Figure 1:
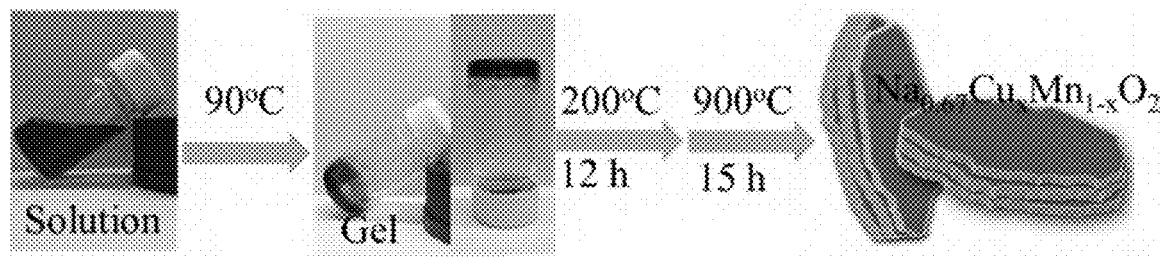
FIG. 1 is a schematic diagram showing preparation of a sample of a compound ($Na_{0.67}Cu_xMn_{1-x}O_2$) for use as material in cathode of a battery.
Figure 2:
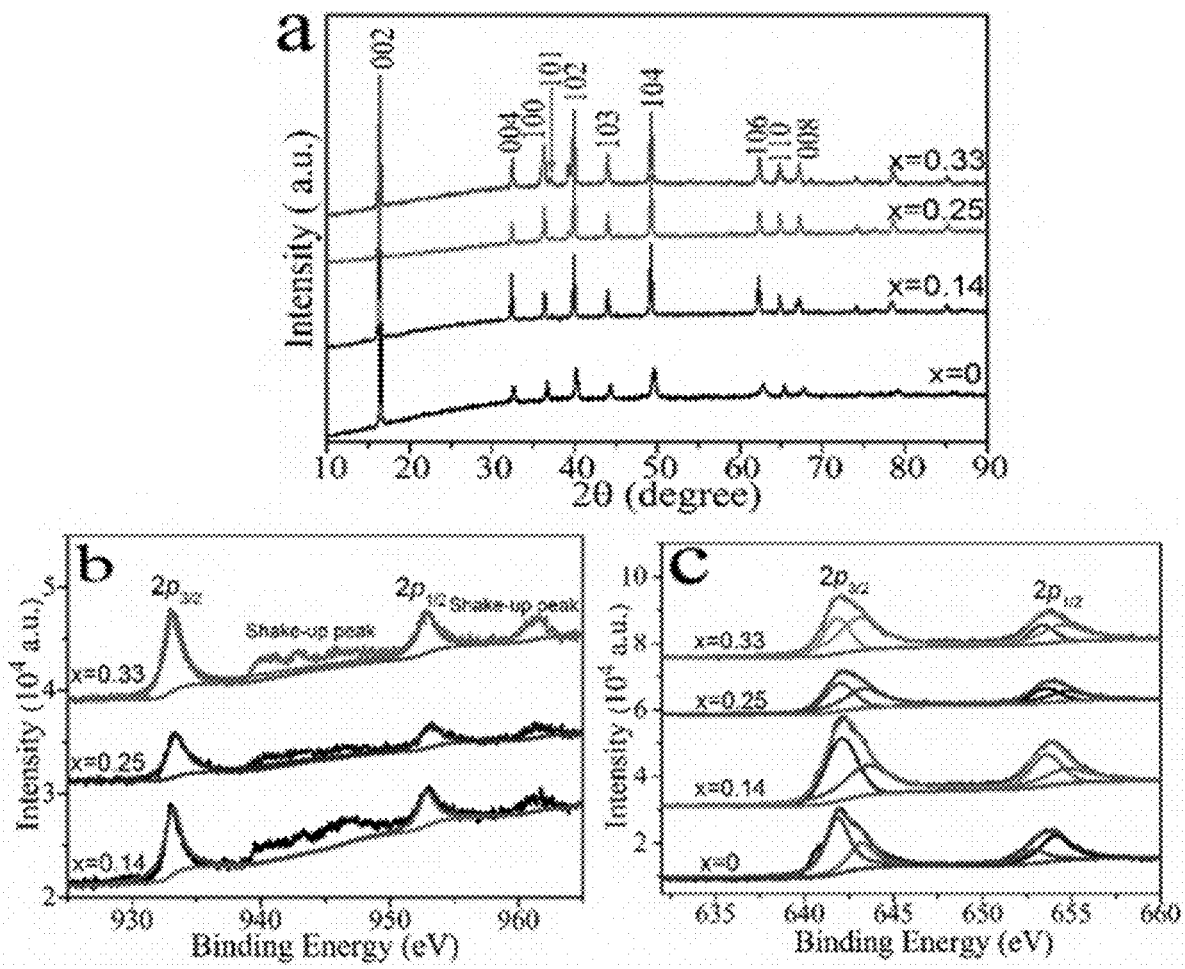
FIG. 2 includes part a), part b) and part c) being graphs of XRD, Cu 2p and Mn 2P XPS core peaks for the as-prepared sample compound of FIG. 1, respectively.

The preparation process of well-crystallized $Na_{0.67}Cu_xMn_{1-x}O_2$ (x=0, 0.14, 0.25 and 0.33) is schematically illustrated in FIG. 1. A simple sol-gel method was adopted and the components in the samples were controlled through changing the ratio of copper acetate and manganese acetate in the reaction while keeping the total amount of metal salts constant. After calcination at 900° C. in air, all diffraction peaks in the X-ray diffraction (XRD) patterns of the samples as shown in FIG. 2, part a) can be well-indexed to a hexagonal lattice with P63/mmc space group, which is in good agreement with the β-type (P2) phase $Na_xMnO_2$ previously reported. (The hexagonal lattice describes the configuration of a symmetry group that the lattice (materials) belong. It may also be monoclinic lattice, orthorhombic lattice, etc.) No P3 or O3-type phase was detected. The lattice parameters were summarized in Table 2, which shows a slight increase in the a-axis with increasing Cu content, while the c-axis is maximized at x=0.14. The presence of substituted $Cu^{2+}$ ions in the $Na_{0.67}Cu_xMn_{1-x}O_2$ plate-like particles is evidenced from the Cu2p peaks observed in the XPS profiles (FIG. 2, part b)). Substituting $Mn^{3+}$ with $Cu^{2+}$ in $Na_{0.67}Cu_xMn_{1-x}O_2$ increases the oxidation state of Mn and produces an unexpected effect. Please see Table 2. The $Mn^{3+}/Mn^{4+}$ ratios in $Na_{0.67}Cu_xMn_{1-x}O_2$ with different compositions were estimated by deconvoluting the Mn 2p XPS peaks. Please see FIG. 2, part c). It is shown that there is a consistent trend with that determined by the ingredient composition.

Figure 3:
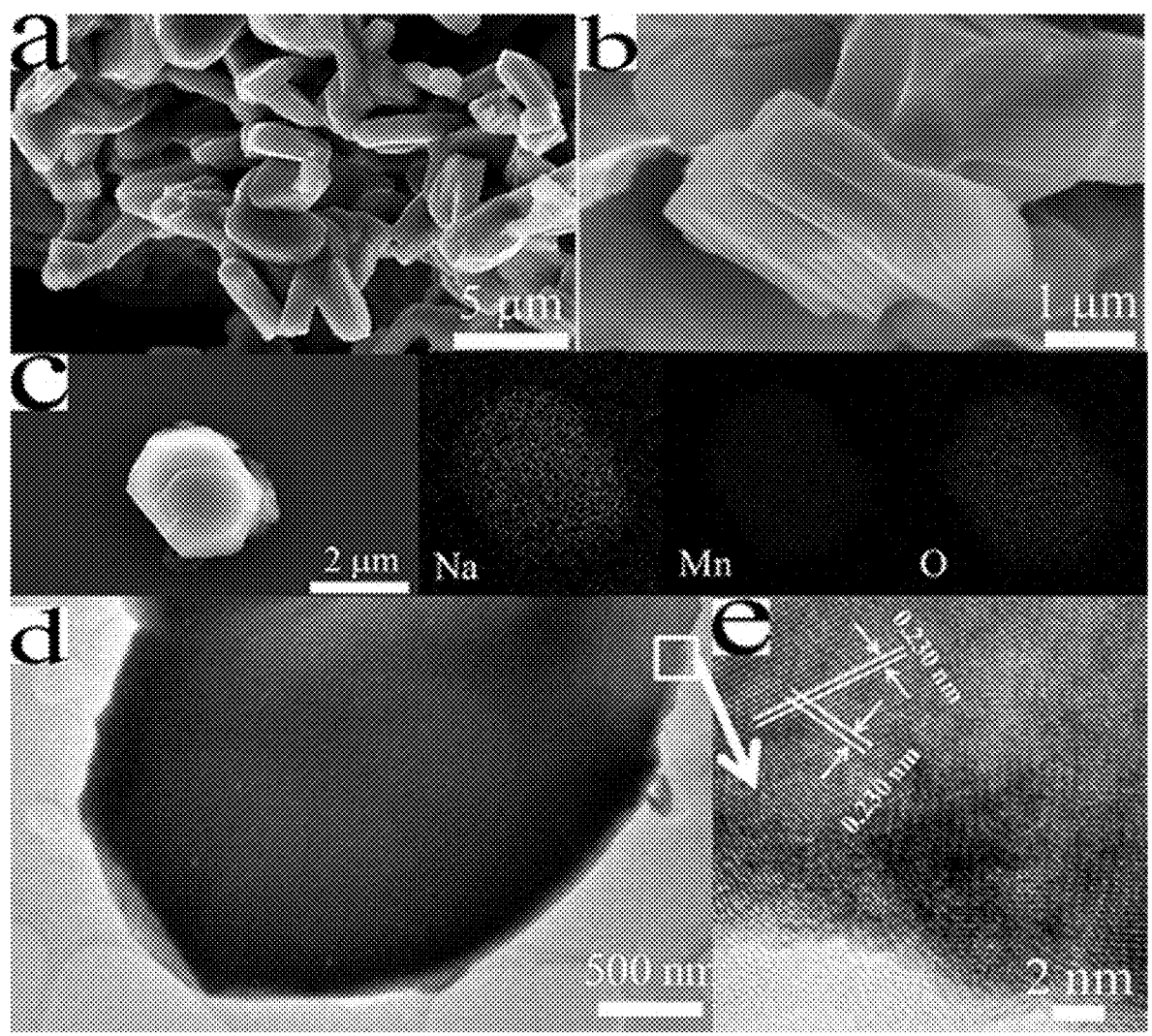
FIG. 3 includes part a), part b), part c), part d), and part e) being images of SEM, SEM, EDX mapping, TEM, and HRTEM of $Na_{0.67}MnO_2$., respectively.
Figure 4:
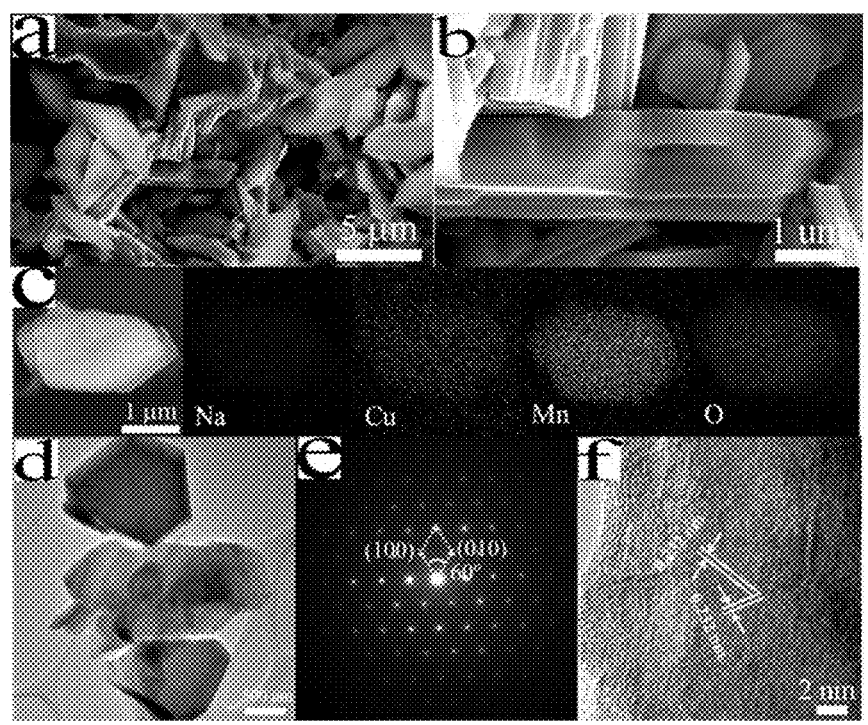
FIG. 4 includes part a), part b), part c), part d), part e) and part f) being images of SEM, SEM, EDX mapping, TEM, SAED and HRTEM of $Na_{0.67}Cu_{0.14}Mn_{0.86}O_2$, respectively.

Results of microstructural characterizations of the $Na_{0.67}MnO_2$ and $Na_{0.67}Cu_{0.14}Mn_{0.8602}$ samples were shown in FIG. 3 and FIG. 4, respectively. FIG. 3, part a) shows that the $Na_{0.67}MnO_2$ sample is an aggregate of plate-like crystallite with several micrometers size. A higher magnification SEM image (FIG. 3, part b)) shows more details of the layered structure in the crystallites. FIG. 3, part c) presents corresponding energy dispersive X-ray (EDX) elemental mapping of the $Na_{0.67}MnO_2$ sample showing uniform distribution of Na, Mn and O. FIG. 3, part d shows a TEM image of a typical crystallite.

FIG. 3, part e) is a high-resolution image of the marked region in FIG. 3, part d showing two sets of lattice fringes both with spacing of 0.230 nm and making an angle of 60°. These match well to the d-spacing of the (100) and the (010) planes of the hexagonal layered phase similar to the reported results.

Figure 9A:
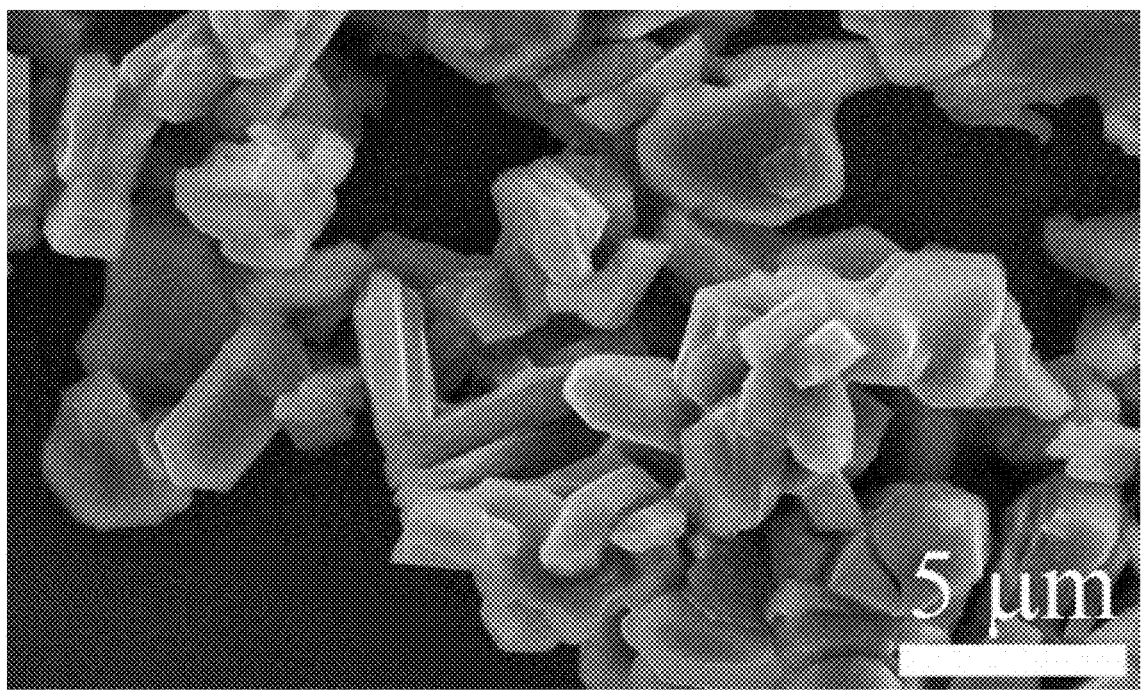
FIG. 9A, 9B are SEM images and FIG. 9C are EDX images of $Na_{0.67}Cu_{0.25}Mn_{0.75O2}$.
Figure 9B:
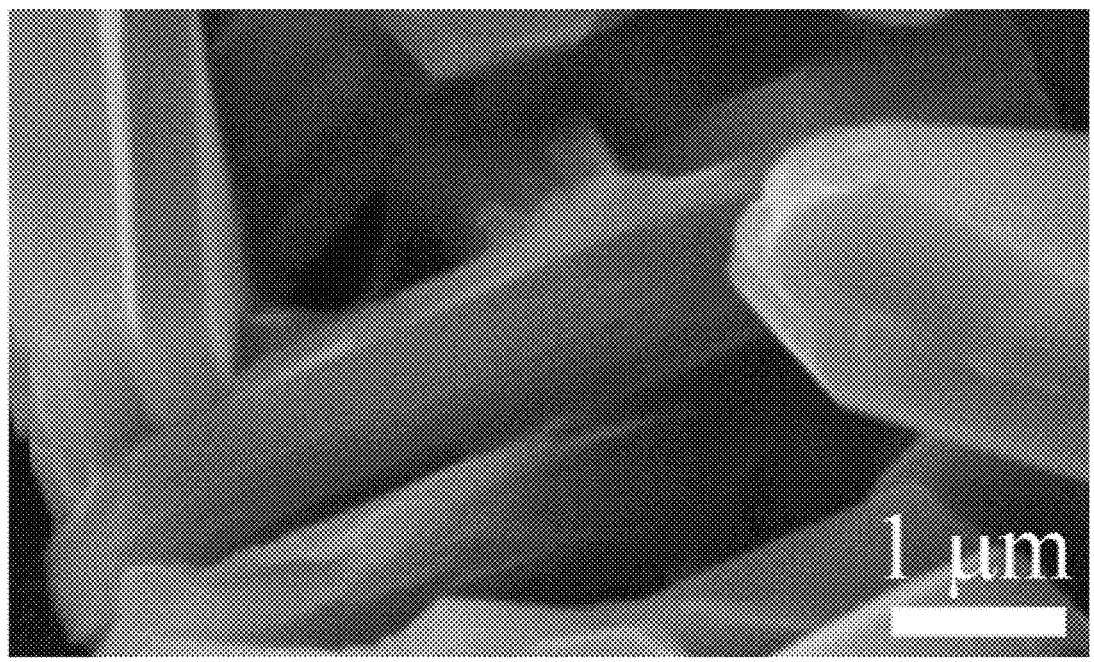
Figure 9C:
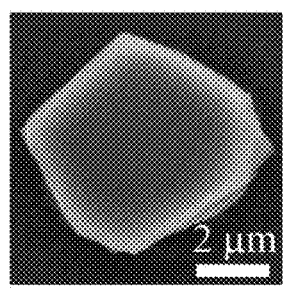
Figure 9C:
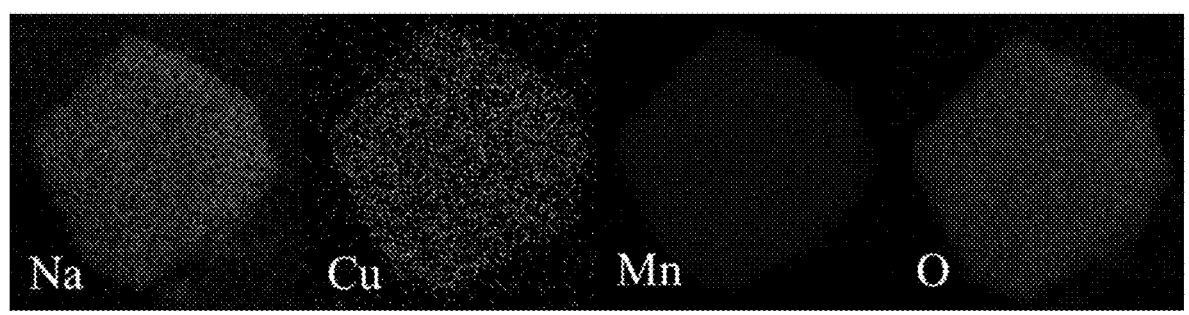

FIG. 4 shows the characterization results for $Na_{0.67}Cu_{0.14}Mn_{0.86}O_2$: similar particle size and morphology compared to $Na_{0.67}MnO_2$ is obtained with Cu substitution. EDX mapping shows that Cu is distributed uniformly throughout the crystallite (FIG. 4, parts a) to c)). FIG. 4, part d) shows that the plate-like crystallites have hexagonal shape. FIG. 4, part e) shows a selected area electron diffraction pattern of one crystallite along the [001] zone axis. An HRTEM image (FIG. 4, part f)) further confirms (100) and the (010) planes of the hexagonal layered structure. Both the electron diffraction pattern and the clear lattice fringes in FIG. 4, parts d) and e) imply that the layered material is composed of single-crystalline particles. $Na_{0.67}Cu_xMn_{1-x}O_2$ with x=0.25 or 0.33 also show similar structure and the images are given in FIGS. 9A, 9B and 9C.

Figure 5:
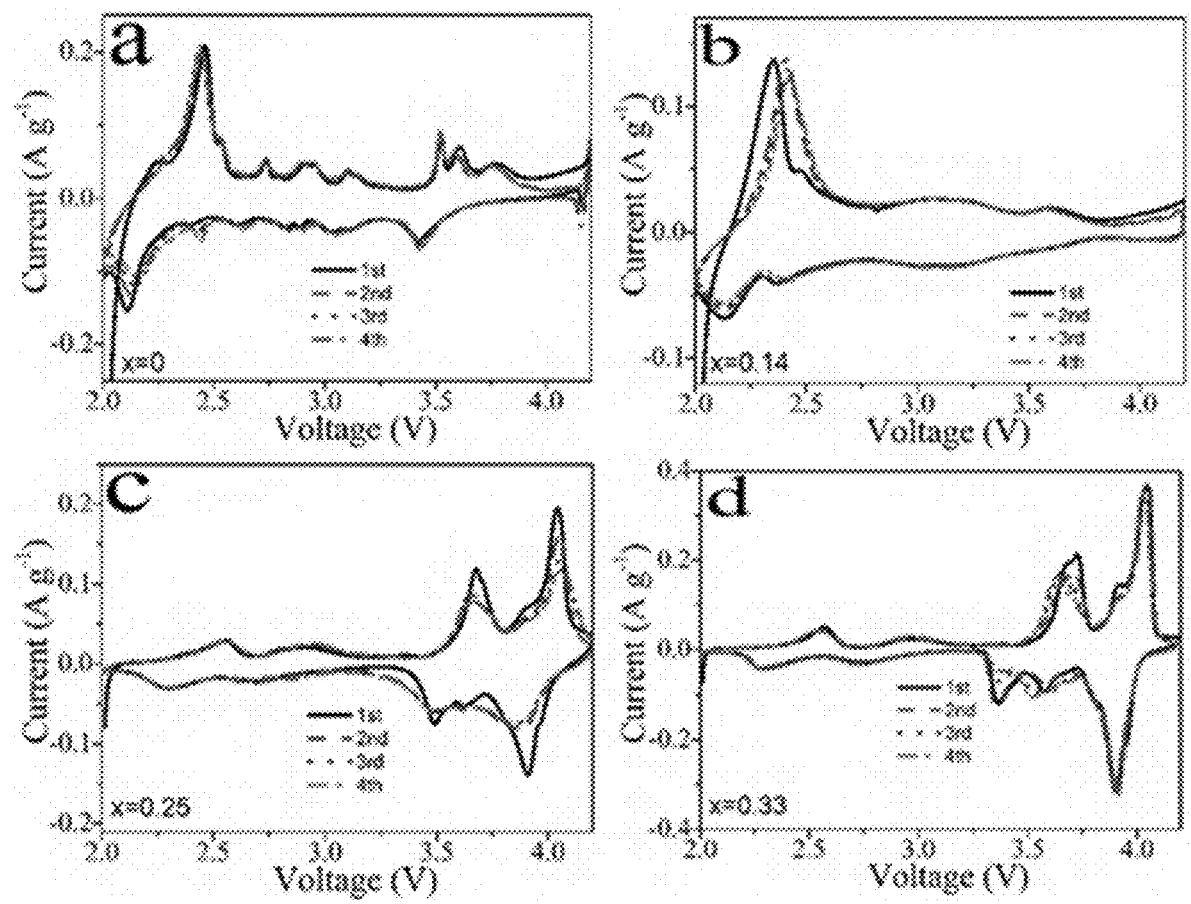
FIG. 5 includes part a), part b), part c) and part d) showing CV curves of various $Na_{0.67}Cu_xMn_{1-x}O_2$ samples at a scan rate of 0.1 mV s$^{-1}$ over the voltage range of 2.0-4.2 V, in which in a) x=0, b) x=0.14, c) x=0.25 and d) x=0.33.

Half cells of various $Na_{0.67}Cu_xMn_{1-x}O_2$ electrodes are tested with Na counter electrodes to investigate the effect of Cu substitution on their electrochemical behavior. FIG. 5 shows the initial four CV profiles of $Na_{0.67}Cu_xMn_{1-x}O_2$ electrodes with x=0, 0.14, 0.25 and 0.33 between 2.0-4.2 V at a scan rate of 0.1 mV $s^{-1}$. $Na_{0.67}MnO_2$ shows a pair of reversible peaks between 2.1 and 2.4 V vs. Na/$Na^+$ and a

TABLE 2

Lattice parameters of $Na_{0.67}Cu_xMn_{1-x}O_2$ (x = 0, 0.14, 0.25 and 0.33).

|  | x = 0 | x = 0.14 | x = 0.25 | x = 0.33 |
|---|---|---|---|---|
| Lattice | hexagonal | hexagonal | hexagonal | hexagonal |
| Space group | P6₃/mmc | P6₃/mmc | P6₃/mmc | P6₃/mmc |
| a | 2.81771 | 2.83739 | 2.83768 | 2.85053 |
| c | 11.18177 | 11.19981 | 11.19473 | 11.18888 |
| V | 76.88 | 78.09 | 78.07 | 78.74 |
| $Mn^{3+}/Mn^{4+}$ | 1.20 | 1.00 | 0.75 | 0.48 |
| Expected Cu state | N/A | 2+ | 2+ | 2+ |
| Expected Mn state | +3.33 | +3.55 | +3.8 | +4 | series of small peaks in a higher potential range, which are associated with $Mn^{4+}/Mn^{3+}$ redox process and phase transformation during the Na-extraction and insertion. This observation is consistent with previous reports. With a small amount of Cu substitution ($x \leq 0.14$), the main $Mn^{4+}/Mn^{3+}$ redox peaks at ~2.2 V remains, but the smaller peaks at higher potential disappeared, suggesting that Cu is able to stabilize the $Na_{0.67}MnO_2$ structure and eliminate the phase transitions. This is crucial in improving the rate performance and stability of the material. With further Cu substitution ($x \geq 0.25$), the reaction peaks shifted to 3.5-4.1 V, which are attributed to the redox couple of $Cu^{3+}/Cu^{2+}$. The difference between the oxidation and reduction peaks for $Cu^{3+}/Cu^{2+}$ is small (<0.1 V), indicating small polarization and good kinetics for the reaction. The CV curves are well-overlapped for these four tested cycles, illustrating the high reversibility of the $Na_{0.67}Cu_xMn_{1-x}O_2$ electrodes.

Figure 6:
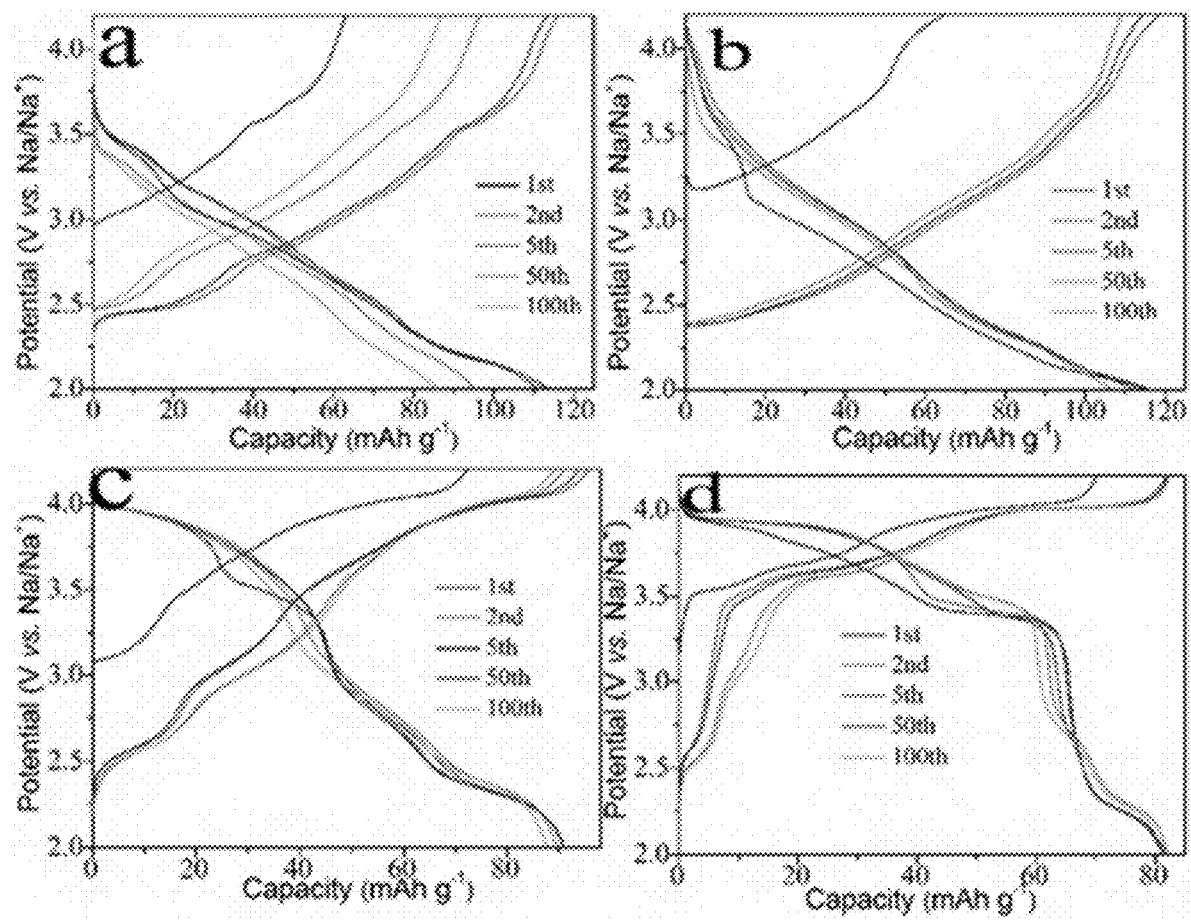
FIG. 6 includes part a), part b) part c) and part d) showing representative charge-discharge curves of the samples of FIG. 5 using electrode at 200 mA g$^{-1}$, in which in a) x=0, b) x=0.14, c) x=0.25 and d) x=0.33.

Electrochemical properties of the samples were further characterized by galvanostatic charge and discharge tests in the voltage range of 2.0-4.2 V. The typical charge/discharge profiles of the $Na_{0.67}Cu_xMn_{1-x}O_2$ electrodes at a current of 200 mA $g^{-1}$ are shown in FIG. 6. First charge capacities of $Na_{0.67}Cu_xMn_{1-x}O_2$ at a current of 200 mA $g^{-1}$ are 63.1, 65.0, 72.3, 70.2 mAh $g^{-1}$ for x=0, 0.14, 0.25 and 0.33, respectively. This corresponds to a removal of Na of 0.33, 0.35, 0.39 and 0.38 from the materials, respectively. The first cycle discharge capacity on the other hand decreases with increasing Cu content. The corresponding first cycle efficiencies are 180.3, 177.5, 125.5 and 116.4%. Charge-discharge profiles of the x=0.14 sample resemble those of $Na_{0.67}MnO_2$ except without the small undulations at higher potential, suggesting the main reactions originate from manganese oxidation state conversions. With x=0.25, the capacity is reduced, but the average potential is raised. Contributions from both higher voltage between 3.5-4.0 V ($Cu^{3+}/Cu^{2+}$) and lower voltage below 3.0 V ($Mn^{4+}/Mn^{3+}$) are observed. When Cu content is increased to x=0.33, the dominant reaction originates from Cu. The results are consistent with CV profiles in FIG. 5.

Not all of the Na in the material can be extracted from the P2 structure initially. $Na_{0.67}MnO_2$ only delivers a capacity of 63.1 mA h $g^{-1}$ in the first charge process, which corresponds to 0.33 $Na^+$ per formula unit. During initial discharge, there are more sites in the structure to accommodate $Na^+$, so about 0.6 Na can be re-inserted back into the lattice, with a first cycle efficiency much bigger than 100%. Increasing Cu content allows more Na to be extracted from the lattice during initial charging from both oxidation of Cu and Mn while less Na is inserted back into the material during discharge. When the Cu content is increased to x=0.33, both charge and discharge capacities originate mainly from the Cu reaction and not from Mn reaction. As a result, the first cycle efficiency is closer to 100%.

Figure 7:
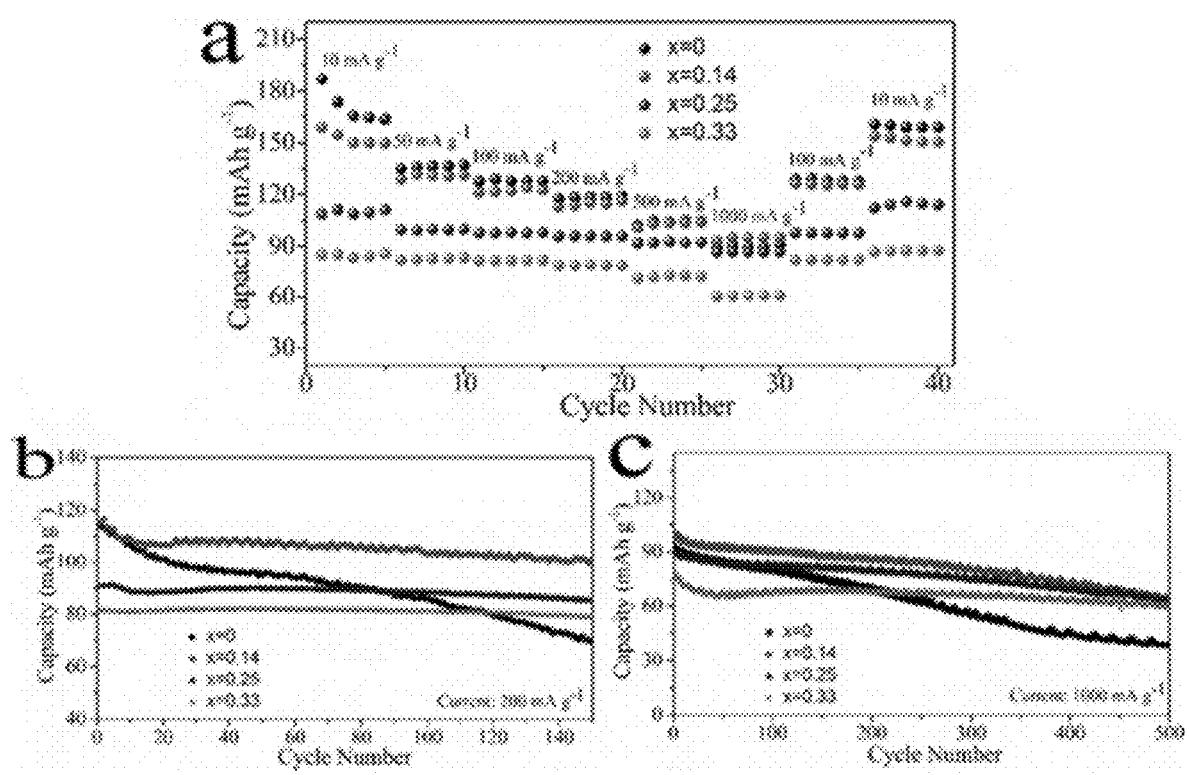
FIG. 7 includes part a), part b) and part c) showing rate capability, cycling performance at current density of 200 mA g$^{-1}$, and long-term cycling at a high current density of 1000 mA g$^{-1}$ for various $Na_{0.67}Cu_xMn_{1-x}O_2$ samples, respectively.

The rate and cycling performance of the $Na_{0.67}Cu_xMn_{1-x}O_2$ electrodes is measured and compared in FIG. 7 and Table 3.

TABLE 3

Electrochemical performance of $Na_{0.67}Cu_xMn_{1-x}O_2$ electrodes with different compositions.

| | 10 mA $g^{-1}$ (3rd) | | 200 mA $g^{-1}$ (18th) | | 1000 mA $g^{-1}$ (28th) | | Rate performance (1000 VS. 10 mA $g^{-1}$) | Capacity retention (200 mA $g^{-1}$) | Capacity retention (1000 mA $g^{-1}$) |
|---|---|---|---|---|---|---|---|---|---|
| x | Capacity/ mAh | Avg. Potential/ V | Capacity/ mAh | Avg. Potential/V | Capacity/ mAh | Avg. Potential/V | | | |
| 0 | 165.7 | 2.42 | 118.4 | 2.76 | 89.6 | 2.67 | 58.2% | 61.7% | 40.8% |
| 0.1 | 149.7 | 2.61 | 115.2 | 2.76 | 94.7 | 2.73 | 63.3% | 87.8% | 63.4% |
| 0.2 | 108.9 | 3.13 | 95.8 | 3.17 | 86.4 | 3.07 | 79.3% | 93.7% | 70.5% |
| 0.3 | 83.3 | 3.37 | 79.1 | 3.38 | 60.6 | 3.29 | 72.7% | 96.9% | 76.6% |

Figure 10:
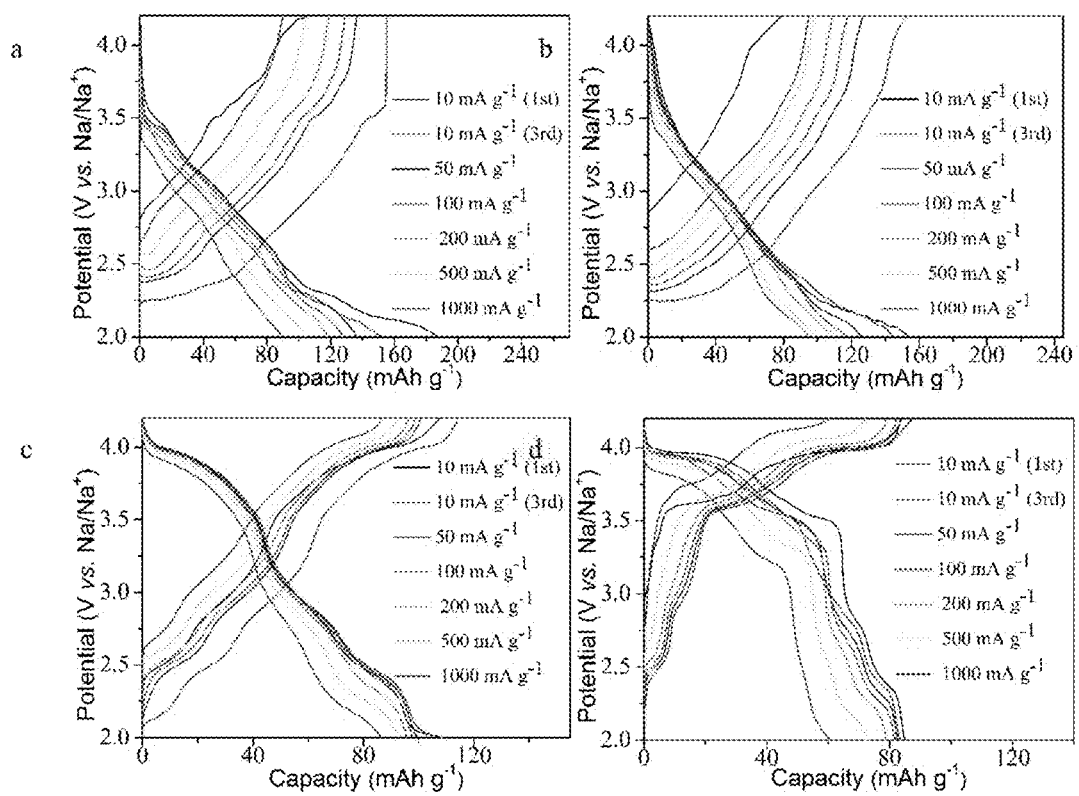
FIG. 10 shows the charge-discharge curves of the electrode at different current density with various $Na_{0.67}Cu_xMn_{1-x}O_2$ samples: (a) x=0, (b) x=0.14, (c) x=0.25 and (d) x=0.33.

At a low current rate of 10 mA $g^{-1}$, a much higher capacity can be obtained for the material with less Cu. For example, $Na_{0.67}MnO_2$ can give a capacity of 165.7 mAh $g^{-1}$. However, when the current rate is increased, the available capacity is reduced. The capacity of $Na_{0.67}MnO_2$ at 1000 mA $g^{-1}$ (89.6 mAh $g^{-1}$) is only 54.1% of the capacity at 10 mA $g^{-1}$. Charge-discharge curves at different current rates for the four samples are shown in FIG. 10. The biggest drop in capacity at high rate originates from the 2-2.5V region, corresponding to Mn reaction. Rate performance is improved with Cu substitution. Ratios of capacity at 1000 mA $g^{-1}$ and that at 10 mA $g^{-1}$ increase to 63.3%, 79.3% and 72.7% with x=0.14, 0.25 and 0.33, respectively. Please see Table 3. These results give clear evidence that a rather fast kinetics of the sodium insertion/extraction electrode can be obtained through Cu-substitution. The increase in rate performance may be due to the increase in lattice constants with Cu substitution, which could lead to easier Na diffusion within the lattice, though further structural analysis is needed to verify this. After cycle tests, the current rate is returned to the initial value of 10 mA $g^{-1}$. Materials made in accordance with the present invention also show excellent cycle stability, as almost all the capacity is recovered. Please see FIG. 7, part a.

Long-term cycling performances of the $Na_{0.67}Cu_xMn_{1-x}O_2$ electrodes were also measured at high current densities of 200 mA $g^{-1}$ and 1000 mA $g^{-1}$ (FIG. 7, parts b) and c)). At a current density of 200 mA $g^{-1}$, $Na_{0.67}MnO_2$ shows a high capacity of 112 mAh $g^{-1}$, but only 61.7% capacity retention can be obtained after 150 cycles, indicating the structure is unstable during Na-extraction and insertion process at fast rate. Cu-substituted samples on the other hand maintain stable capacity with cycling. After 150 cycles, the $Na_{0.67}Cu_xMn_{1-x}O_2$ electrodes with x=0.14, 0.25 and 0.33 show capacity retentions of 87.8%, 93.7% and 96.9%, respectively. Even at a higher current rate of 1000 mA $g^{-1}$, the Cu-doping $Na_{0.67}Cu_xMn_{1-x}O_2$ cathode can show excellent cycling stability within 500 cycles as shown in FIG. 7, part c).

Compared to a capacity retention of 40.8% for $Na_{0.67}MnO_2$, capacity retention increases to 76.6% after 500 cycles for x=0.33. Cu substitution allows the material to be charged and discharged at a higher current rate with small amount of decay per cycle.

Figure 11:
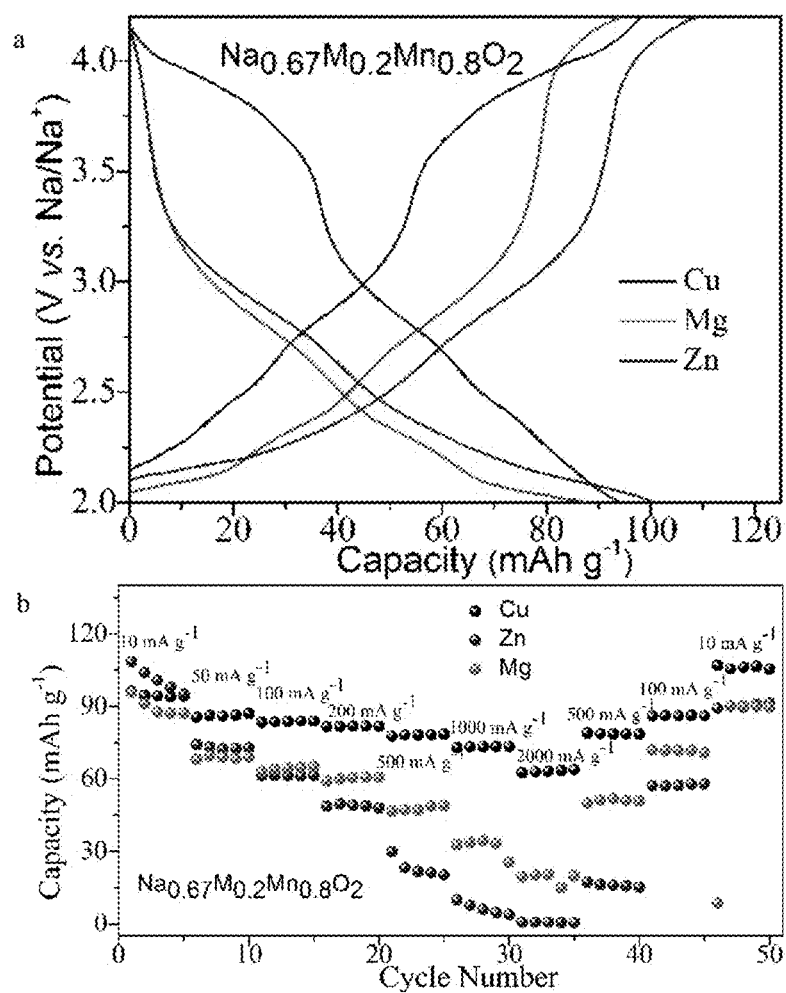
FIG. 11 is a comparison of part a), representative charge-discharge curves at 10 mA g$^{-1}$, and part b) the rate capabilities for Na$_{0.67}$M$_{0.20}$Mn$_{0.80}$O$_2$ (M=Cu, Zn and Mg) electrodes.

Samples with Mg or Zn-substitution were also prepared and the results are compared as shown in FIG. 11. As opposed to the Cu-substituted sample, Mg or Zn-substitution samples do not show reactions at the higher voltage of 3.5-4.0 V (FIG. 11, part a). In addition, the rate performances of Mg or Zn-substitution materials are inferior to that of Cu-substitution materials. These results indicate that Cu is essential to provide the high potential and superior rate performance in our samples (FIG. 11, part b).

The experiments leading to the present inventon show that one of the best material (x=0.14) can give a capacity of more than 90 mAh g$^{-1}$ at a current rate of 1000 mA g$^{-1}$. This corresponds to a charge or discharge time of 5 mins. Average potential of our material is between 2.6-3.3 V, so the obtained energy density is 260 Wh kg$^{-1}$ at a power density of about 3000 W kg$^{-1}$. This is comparable with cathode materials for LIB. The improved rate and cycling performance is attributed to fast kinetics and structural stability with Cu substitution. The excellent power and stability of the material make it an attractive choice as cathode for high performance NIB.

In one example, micron-sized copper-substituted $Na_{0.67}Cu_xMn_{1-x}O_2$ (x=0, 0.14, 0.25, 0.33) layered oxides with a P2-type structure (space group P63/mmc) was prepared with a simple sol-gel method. The increase in Cu content leads to decrease in discharge capacity but an increase in reaction potential. This is attributed to the shift in reaction from $Mn^{3+}/Mn^{4+}$ to $Cu^{2+}/Cu^{3+}$. A compound with x=0.25 shows contributions from both reactions. Even though the capacity is reduced, Cu reaction has fast kinetics, and rate performance is significantly improved, despite that the particles are micron-sized.

Capacity retention of more than 70% at a current rate of 1000 mA g$^{-1}$ (~12C rate) can be maintained after 500 cycles. In addition, stability of the material is improved with Cu substitution, showing good cycling performance. The high potential, high rate performance and good cycle performance makes the Cu-substituted layered material an attractive cathode for NIB.

As demonstrated above, mircon-sized plate-like copper-substituted layered cathode materials such as P2-type $Na_{0.67}Cu_xMn_{1-x}O_2$ is demonstrated to be able to fast charge and discharge within 5 minutes while still gives a capacity of more than 90 mAh g$^{-1}$. This corresponds to an energy density of 260 Wh kg$^{-1}$ at a power density of 3000 W kg$^{-1}$, comparable to high-power lithium ion battery cathodes. These materials show excellent stability and keeps more than 70% of its initial capacity after 500 cycles at a current of 1000 mA g$^{-1}$. At a current rate of 200 mA g$^{-1}$, capacity retention is improved to more than 90% after 150 cycles. The good cycling performance at high current rate is attributed to copper in the lattice, which stabilizes the crystal structure, raises the average discharge potential and improves sodium transport. This makes the material an ideal choice as cathode for high-power sodium-ion or sodium/lithium-ion batteries.

It should be understood that certain features of the invention, which are, for clarity, described in the content of separate embodiments, may be provided in combination in a single embodiment. Conversely, various features of the invention which, for brevity, described in the content of a single embodiment, may be provided separately or in any appropriate sub-combinations. It is to be noted that certain features of the embodiments are illustrated by way of non-limiting examples. For example, in some of the aforementioned example M in the chemical formulae $Na_yCu_xM_{1-x}O_2$, or $Li_aNa_bCu_xM_{1-x}O_2$ refers to manganese (Mn). However, other transition metal such as cobalt or iron can also be used. Also, a skilled person in the art will be aware of the prior art which is not explained in the above for brevity purpose. In this regard, the skilled person will be aware of at least the reference listed below, and contents of all these references are incorporated in their entirety.

REFERENCES

1 M. Armand and J. M. Tarascon, *Nature*, 2008, 451, 652.
2 N.-S. Choi, Z. Chen, S. A. Freunberger, X. Ji, Y.-K. Sun, K. Amine, G. Yushin, L. F. Nazar, J. Cho and P. G. Bruce, *Angew. Chem. Int. Ed.*, 2012, 51, 9994.
3 B. Scrosati, J. Hassoun and Y. K. Sun, *Energy Environ. Sci.* 2011, 4, 3287.
4 S. W. Kim, D. H. Seo, X. H. Ma, G. Ceder and K. Kang, *Adv. Energy Mater.*, 2012, 2, 710.
5 C. S. Park, H. Kim, R. A. Shakoor, E. Yang, S. Y. Lim, R. Kahraman, Y. Jung and J. W. Choi, *J. Am. Chem. Soc.*, 2013, 135, 2787.
6 Y. S. Wang, X. Q. Yu, S. Y. Xu, J. M. Bai, R. J. Xiao, Y. S. Hu, H. Li, X. Q. Yang, L. Q. Chen and X. J. Huang, *Nat. Commun.*, 2013, 4, 1870.
7 Z. L. Jian, W. Z. Han, X. Lu, H. X. Yang, Y. S. Hu, J. Zhou, Z. B. Zhou, J. Q. Li, W. Chen, D. F. Chen and L. Q. Chen, *Adv. Energy Mater.*, 2013, 3, 156.
8 H. Pan, Y.-S. Hu and L. Chen, *Energy Environ. Sci.*, 2013, 6, 2338.
9 M. D. Slater, D. Kim, E. Lee and C. S. Johnson, *Adv. Funct. Mater.*, 2013, 23, 947.
10 M. H. Han, E. Gonzalo, G. Singh and T. Rojo, *Energy Environ. Sci.*, 2015, 8, 81.
11 J. Billaud, R. J. Clement, A. R. Armstrong, J. Canales-Vazquez, P. Rozier, C. P. Grey and P. G. Bruce, *J. Am. Chem. Soc.*, 2014, 136, 17243.
12 P. Barpanda, T. Ye, S. Nishimura, S.-C. Chung, Y. Yamada, M. Okubo, H. S. Zhou and A. Yamada, *Electrochem Commun*, 2012, 24, 116.
13 W. C. Duan, Z. Q. Zhu, H. Li, Z. Hu, K. Zhang, F. Y. Cheng and J. Chen, *J. Mater. Chem. A*, 2014, 2, 8668.
14 T. Honma, N. Ito, T. Togashi, A. Sato and T. Komatsu, *J. Power Sources*, 2013, 227, 31.
15 C. W. Mason, I. Gocheva, H. E. Hoster and D. Y. W. Yu, *Chem. Commun.*, 2014, 50, 2249.
16 Y. H. Jung, C. H. Lim and D. K. Kim, *J. Mater. Chem. A*, 2013, 1, 11350.
17 R. Berthelot, D. Carlier and C. Delmas, *Nat. Mater.*, 2011, 10, 74.
18 S. Komaba, C. Takei, T. Nakayama, A. Ogata and N. Yabuuchi, *Electrochem. Commun.*, 2010, 12, 355.
19 J. Zhao, L. Zhao, N. Dimov, S. Okada and T. Nishida, *J. Electrochem. Soc.*, 2013, 160, A3077.
20 N. Yabuuchi, H. Yoshida and S. Komaba, Electrochemistry, 2012, 80, 716.
21 X. Ma, H. Chen and G. Ceder, *J. Electrochem. Soc.*, 2011, 158, A1307.
22 C. Delmas, Y. Borthomieu and C. Faure, *Solid State Ionics*, 1989, 32/33, 104.
23 C. Delmas, C. Fouassier and P. Hagenmuller, *Physica B*, 1980, 99, 81.
24 A. Mendiboure, C. Delmas and P. Hagenmuller, *J. Solid State Chem.*, 1985, 57, 323-331
25 N. Bucher, S. Hartung, A. Nagasubramanian, Y. L. Cheah, H. E. Hoster and S. Madhavi, *ACS Appl. Mater. Interfaces*, 2014, 6, 8059.
26 D. W. Su, C. Y. Wang, H. J. Ahn and G. X. Wang, *Chem. Eur. J.*, 2013, 19, 10884.

27 X. F. Wang, M. Tamaru, M. Okubo and A. Yamada, *J. Phys. Chem. C,* 2013, 117, 15545

28 W. W. Zhao, H. Kirie, A. Tanaka, M. Unno, S. Yamamoto and H. Noguchi, *Mater Lett.,* 2014, 135, 131.

29 J. Zhao, J. Xu, D. H. Lee, N. Dimov, Y. S. Meng and S. Okada, *J. Power Sources,* 2014, 264, 235.

30 B. M. Boisse, D. Carlier, M. Guignard, L. Bourgeois and C. Delmas, *Inorg. Chem.,* 2014, 53, 11197.

31 N. Yabuuchi, M. Kajiyama, J. Iwatate, H. Nishikawa, S. Hitomi, R. Okuyama, R. Usui, Y. Yamada and S. Komaba, *Nature Mater.,* 2012, 11, 3309.

32 H. L. Zhu, K. T. Lee, G. T. Hitz, X. G. Han, Y. Y. Li, J. Y. Wan, S. Lacey, A. W. Cresce, K. Xu, E. Wachsman and L. B. Hu, *ACS Appl. Mater. Interfaces,* 2014, 6, 4242.

33 J. Billaud, G. Singh, A. R. Armstrong, E. Gonzalo, V. Roddatis, M. Armand, T. Rojo and P. G. Bruce, *Energy Environ. Sci.,* 2014, 7, 1387.

34 N. Yabuuchi, R. Hara, K. Kubota, J. Paulsen, S. Kumakura and S. Komaba, *J. Mater. Chem. A,* 2014, 2, 16851.

35 C. W. Mason, F. Lange, K. Saravanan, F. Lin and D. Nordlund, *ECS Electrochem Lett,* 2015, 4, A41-A44.

36 I. Hasa, D. Buchholz, S. Passerini, B. Scrosati and J. Hassoun, *Adv. Energy Mater.,* 2014, 4, 1400083.

37 D. Kim, E. Lee, M. Slater, W. Lu, S. Rood and C. S. Johnson, *Electrochem. Comm.,* 2012, 18, 66-69.

38 D. D. Yuan, W. He, F. Pei, F. Y. Wu, Y. Wu, J. F. Qian, Y. L. Cao, X. P. Ai and H. X. Yang, *J. Mater. Chem. A,* 2013, 1, 3895.

39 S. Doubaji, M. Valvo, I. Saadoune, M. Dahbi and K. Edstrom, *J. Power Sources,* 2014, 266, 275.

40 L. G. Chagas, D. Buchholz, C. Vaalma, L. Wu and S. Passerini, *J. Mater. Chem. A,* 2014, 2, 20263.

41 A. Caballero, L. Hernán and J. Morales, L. Sanchez, J. Santos Pena and M. A.

G. Aranda, *J. Mater. Chem.,* 2002, 12, 1142.

42 Z. Lu, R. A. Donaberger and J. R. Dahn, *Chem. Mater.,* 2000, 12, 3583.

43 S. Y. Xu, X. Y. Wu, Y. M. Li, Y. S. Hu and L. Q. Chen, *Chin. Phys. B,* 2014, 23, 118202.

44 Y. M. Li, Z. Z. Yang, S. Y. Xu, L. Q. Mu, L. Gu, Y.-S. Hu, H. Li and L. Q. Chen. *Adv. Sci.,* 2015, 1500031.

45 J. B. Goodenough, *Acc. Chem. Res.,* 2013, 46, 1053.

46 R. Mukherjee, R. Krishnan, T. M. Lu and N. Koratkar, *Nano Energy,* 2012, 1, 518.

47. J. P. Parant, R. Olazcuaga, M. Devalette, C. Fouassier and P. Hagenmuller, *J. Solid State Chem.* 1971, 3, 1-11

The invention claimed is:

1. A lattice structure of a cathode compound wherein said compound consists of:
   a) a first ingredient of sodium;
   b) a second ingredient of copper;
   c) a third ingredient (M) of a first transition metal selected from the group consisting of nickel, iron, zinc, vanadium, titanium, molybdenum and tungsten, niobium, rubidium, tin, zirconium, and a fourth ingredient as a second transition metal; and
   d) oxygen as a fifth ingredient; wherein:
   the compound has a chemical formula of $Na_yCu_xM_{1-x}O_2$;
   x has a value of $0.02 \le x \le 0.30$ and y has a value $0.6 \le y \le 0.75$;
   the compound has a structure of P2 or P2/P3; and
   particle size of the compound has an average width of 0.05 to 10 µm.

2. A lattice structure as claimed in claim 1, wherein said lattice structure has a layered structure in which one layer thereof is occupied by alkali metal only and a different layer is occupied by transition metal only.

3. A sodium battery comprising a cathode, said cathode consisting of one compound, and said compound consisting of:
   a) a first ingredient of sodium;
   b) a second ingredient of copper;
   c) a third ingredient (M) of a transition metal selected from the group consisting of nickel, iron, zinc, chromium, vanadium, titanium, molybdenum and tungsten, niobium, rubidium, tin, zirconium; and
   d) oxygen as a fourth ingredient; wherein:
   the compound has a chemical formula of $Na_yCu_xM_{1-x}O_2$;
   x has a value of $0.02 \le x \le 0.30$ and y has a value $0.6 \le y \le 0.75$;
   the compound has a morphology of particles with an average width of 0.05 to 10 µm; and
   the compound has a structure of P2 or P2/P3.

4. A battery as claimed in claim 3, wherein the compound has a layered lattice structure in which one layer thereof is occupied by alkali metal only, and a different layer is occupied by transition metal only.

* * * * *